United States Patent [19]
Hadnagy et al.

[11] 3,819,298
[45] June 25, 1974

[54] CHEMICAL INJECTION SYSTEM
[76] Inventors: Thomas D. Hadnagy, 17 Briar Ln., Roslyn Heights, N.Y. 11577; Arthur Goldberg, 88-04-209th St., Queens Village, N.Y. 11427
[22] Filed: Oct. 2, 1972
[21] Appl. No.: 293,944

[52] U.S. Cl. ................................................ 417/44
[51] Int. Cl. ............................................ F04b 49/02
[58] Field of Search .................. 417/12, 44; 222/70

[56] References Cited
UNITED STATES PATENTS

| | | | |
|---|---|---|---|
| 2,646,189 | 7/1953 | Wickesberg | 222/70 |
| 2,751,114 | 6/1956 | Greaves | 220/70 |
| 2,980,293 | 4/1961 | Leittie | 222/70 |
| 3,018,922 | 1/1962 | Williamson | 222/70 |
| 3,026,916 | 3/1962 | Kennedy | 222/70 |
| 3,124,271 | 3/1964 | Beck et al. | 222/70 |
| 3,141,475 | 7/1964 | Guinard | 417/44 |
| 3,209,950 | 10/1965 | Rise et al. | 222/70 |

Primary Examiner—William L. Freeh
Attorney, Agent, or Firm—Kenneth S. Goldfarb

[57] ABSTRACT

A chemical injection system and circuitry therefor including a pressure tank, a pump to supply chemicals to the pressure tank, a pressure control switch to regulate the pressure within the pressure tank, and a cam operated solenoid valve to regulate chemical injection from the pressure tank.

2 Claims, 2 Drawing Figures

CHEMICAL INJECTION SYSTEM

BACKGROUND OF THE INVENTION

1. Field of the Invention

This invention relates to a chemical injection system. More specifically, this invention provides an alternating current electro-mechanical chemical injection system that regulates the injection of chemicals from a pressure tank.

2. Description of the Prior Art

In the ever demanding technological state of controlling mixtures of fluids, fluid additives, and the like, the use of chemical injection systems have become increasingly necessary to be employed due to the fact that accurate and timely amounts of chemicals have to be injected under specified pressures with limited supervision. In the use of any chemical injection system of a type in which the chemical is injected from a fluid reservoir by utilizing a cam operated solenoid, it is highly desirable, if not essential, that not only should there be accurate and reliable injection of chemicals into an oil line or the like, but also this injection should provide for an alarm or light to indicate to the operator when the supply chemicals are dry of its source; and thereby automatically cut off the power supply to the electro-mechanical circuitry terminating all injection of chemicals.

Without accurate and reliable control of injection of chemicals, there would be many instances where the quantity injected would exceed the desired amounts and thereby rendering unfit the fluid that is being treated. Without accurate and reliable control, there would also be many instances where too little chemicals are being injected and this also would render unfit the treated fluid. Control also should be done with minimal supervision because of the ever increasing cost of labor.

SUMMARY OF THE INVENTION

The present invention accomplishes its desired object by a combination of a pressurized fluid reservoir; means for supplying fluids to the reservoir; means for regulating pressure of the reservoir; and means for controlling fluid injection from the reservoir. The means for supplying fluids to the reservoir is preferably a motor driven pump. The means for regulating pressure of the pressurized fluid reservoir is preferably a pressure switch including contacts, or the like, to control the flow of alternating current permitted to pass, and thereby stopping the pump motor at a particular desired pressure. In a preferred embodiment, between the pump motor and pressure switch, there are contacts in the pressure switch controlling the flow of alternating current to operate the motor at a pressure range of 20 psi to 40 psi within the pressurized fluid reservoir, or pressure tank.

Further, it is an object of the invention to provide a chemical injection system that requires limited supervision.

It is another object of the invention to provide for an automatic cut-off for the pump motor and cam motor when the source for chemicals that supplies the fluid reservoir is dry.

These, together with various ancillary objects and features which will become apparent to those skilled in the art as the following description proceeds, are attained by this chemical injection system and circuitry, a preferred embodiment being shown in the accompanying drawings, by way of example only, wherein:

Figure 1:
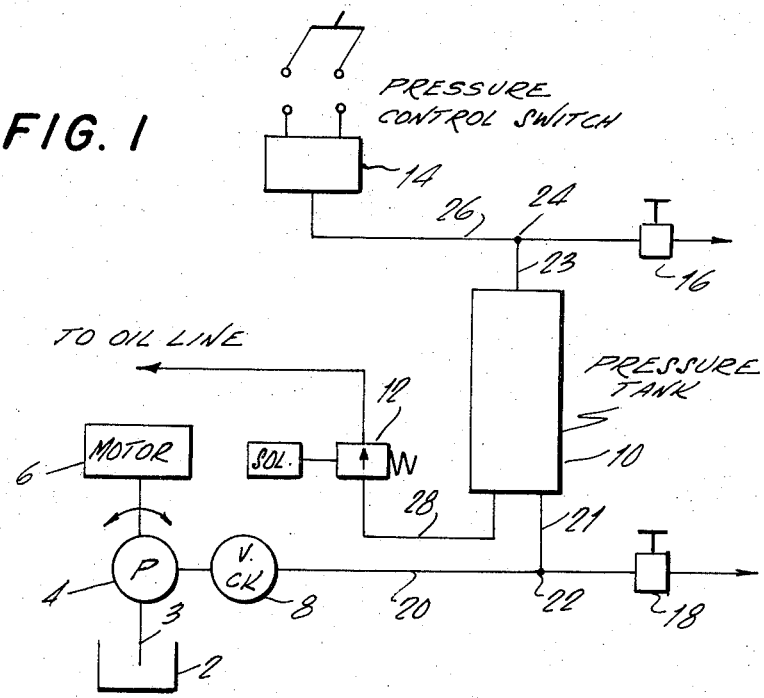
FIG. 1 is a schematic diagram illustrating a flow scheme for the preferred embodiment of the chemical injection system.

Referring in detail now to the drawings, wherein like reference numerals designate identical parts throughout the views, and in particular to FIG. 1, there is seen a motor 6, driving a pump 4 taking suction on a chemical supply reservoir 2 via conduit 3. Pump 4 discharges chemicals through a check valve 8 via conduit 20 to tee joint 22 where chemicals enter a pressure tank 10 through a conduit 21. Also provided on conduit 20 is a hand valve 18. A pressure switch 14 controls the pressure within the pressure tank 10 by chemical fluid pressure through conduit 23, tee joint 24, and conduit 26. Also provided on conduit 26 is a hand valve 16. Chemicals exit the pressure tank 10 through conduit 28 and injection is regulated by a cam operated solenoid valve 12.

Figure 2:
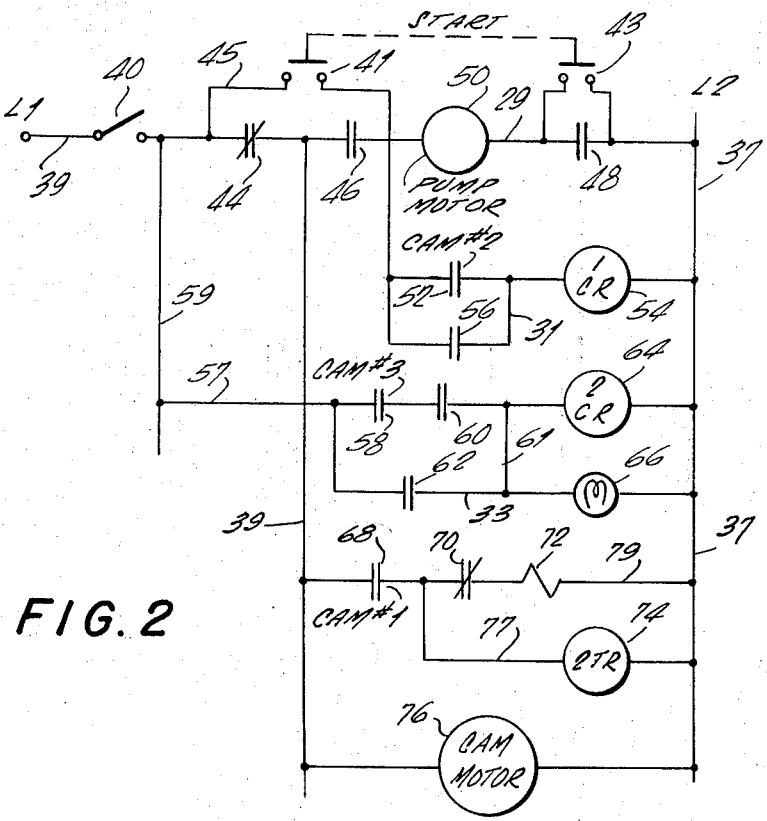
FIG. 2 is a schematic wiring diagram illustrating the circuitry for the flow scheme of the invention.

As shown in the circuit diagram of FIG. 2, there are provided a pair of conductors 39 and 37, to which are applied a continuous alternating current from a power source. A cam motor 76 is connected to the power source across lines 37 and 39. Also connected in series with source are togle switch 40 and normally closed 44 of the relay 64. A solenoid valve circuit includes contact 68, time relay normally closed contacts 70 operated by timer 74 and solenoid valve coil 72 and are connected in order stated in series via line 79 across cam motor 76. Time relay 74 is connected via line 77 on cam motor side and across contacts 70 and coil 72. A first control circuit across source includes normally open contacts 58 and 60 and control relay 64 and are connected in series in the order stated by conductors 57 and 59 from between togle switch 40 and contacts 44 to solenoid valve circuit side of source. Normally open contacts 62 and light 66 are connected to order stated in series via line 33 across contacts 58, 60 and relay 64 to solenoid valve circuit side of source. Conductor 61 connects from between light 66 and contacts 62 to between control relay 64 and contacts 60 of control relay 54.

A second control circuit is shown through line 45 which includes push button double contact 41, contacts 52, and control relay 54 connected in order stated in series from between togle switch 40, contacts 44 of relay 64 to the first control circuit side and across the source. Contacts 56 are connected across the contacts 52.

A pressure control circuit is shown via line 29 and includes pressure switch contacts 46, pump motor 50, and contacts 48 connected in series in the order stated from between contacts 44 of relay 64 which are normally closed and the solenoid valve circuit across the power source and additionally includes two contact push button switch 43 connected across contacts 48.

The invention operates by initally closing togle switch 40, and subsequently pressing push buttons switches 41 and 43 which immediately starts cam motor 76 and pump motor 50. Switches 41 and 43 are depressed until contacts 46 and 48 close, which occurs at approximately 20 psi within pressure tank 10 and switches 41 and 43 may subsequently be released. When the pressure with the pressure tank has reached approximately 40 psi, the pressure switch 10 breaks contacts 46 and 48 and stops the pump motor 50. However, pressure switch 14 has no control for stopping cam motor 76 which continuously runs after pump motor 50 stops.

Cam motor 76 operates cams 52, 58 and 68 which also include contacts 68, 58, and 52. Adjustable timing relay 74 and cam 68 control the injection of chemicals. This injection can be regulated by manual adjustment of adjustable time relay 74. When cam 68 disconnects adjustable timing relay 74, the injection of chemicals ceases. When adjustable timing relay 74 is closed, chemicals are being injected by valve solenoid 12 which includes normally closed contacts 70 and coil 72.

Cam 52 provides for an automatic cut-off when the chemical supply container is dry. Control relay 54 is normally interlocked. However, when chemical supply container is dry, and cam motor is running, cam 52, which is in parallel with contacts 56, picks up interlocked control relay 54 which is in series with the parallel circuit of cam 52 and contacts 56. Cam 58 which is in series with contacts 60 and in combination with contacts 62, angularly shifts to cam 52 and picks up control relay 64 which becomes interlocked and with contacts 44 disconnects pump motor 50 and cam motor 76. Light 66 goes on and the supply chemical container has to be replaced. Interlocked control relay 64 is dosconnected even though togle switch 40 is still connected. The cycle may subsequently be started over by opening and then closing togle switch 40 and subsequently pressing start button 42.

A latitude of modification, change and substitution is intended in the foregoing disclosure and in some instances some features of the invention will be employed without a corresponding use of other features.

We claim:

1. A control mechanism for regulating the injection of chemicals comprising a cam motor connected to a power source, a solenoid valve circuit including first normally open contacts and first normally closed contacts and the coil of a solenoid valve connected across said cam motor, a time relay connected across said first normally closed contacts and said coils, second normally closed contacts connected in series with said cam motor, a togle switch connected in series with said second contacts and said cam motor, a first control circuit including a third and fourth contacts, and a control relay connected in series from between said toble switch and said second normally closed contacts to said solenoid valve circuit and having fifth contacts and a light connected in series across said second contacts, said fourth contacts, and said control relay, and additionally having a conductor connected from between said light and said fifth contacts to between said control relay and said fourth contacts, a second control circuit including a first push button switch, sixth contacts, and second control relay connected in series from between said togle switch and said second normally closed contacts to first control circuit side and across said source, and having seventh contacts connected across said sixth contacts, and a pressure control circuit including eighth contacts a pump motor, ninth contacts connected in series from between said second normally closed contacts and said solenoid valve circuit to said second control circuit, and having a second push button switch connected across said ninth contacts.

2. An apparatus for injection of fluids comprising a pressurized fluid reservoir, means for supplying fluids to pressurized fluid reservoir, means for regulating pressure of said pressurized fluid reservoir, and means for controlling fluid injection from said pressurized fluid reservoir, said pressurized fluid reservoir is a pressure tank, said means for supplying fluids to said pressurized fluid reservoir includes a pump and an electric motor connected to said pump, said means for regulating pressure of said pressurized fluid reservoir includes a pressure control switch, and said means for controlling fluid injection from pressurized fluid reservoir includes a cam motor operated solenoid valve.

* * * * *